No. 646,754. Patented Apr. 3, 1900.
F. A. NUSBAUM.
LEAK CLOSING PIPE CLAMP.
(Application filed Apr. 26, 1899.)
(No Model.)
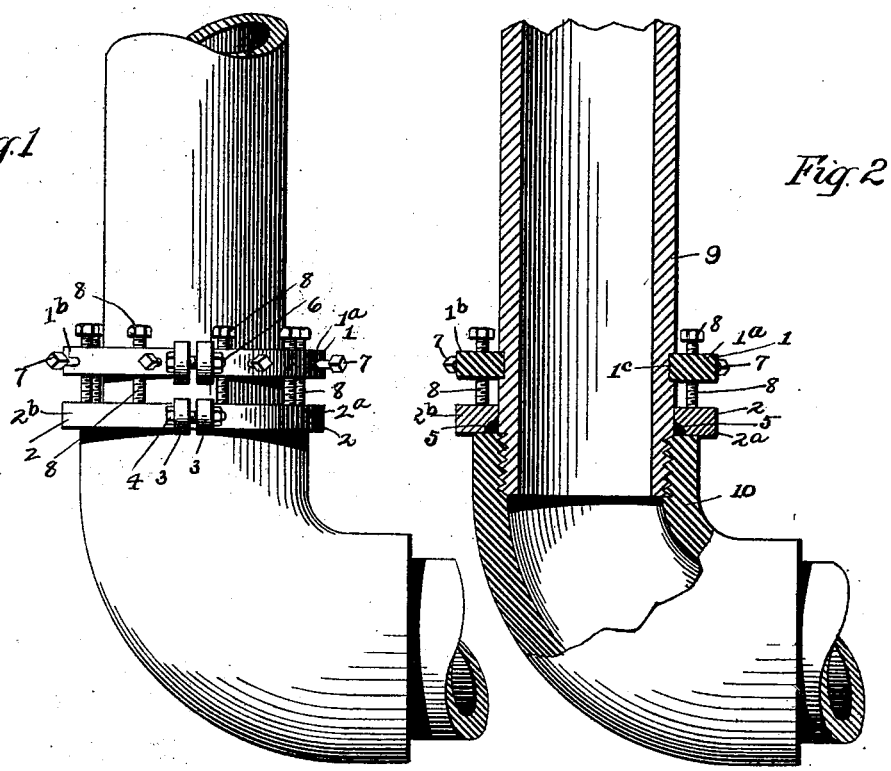
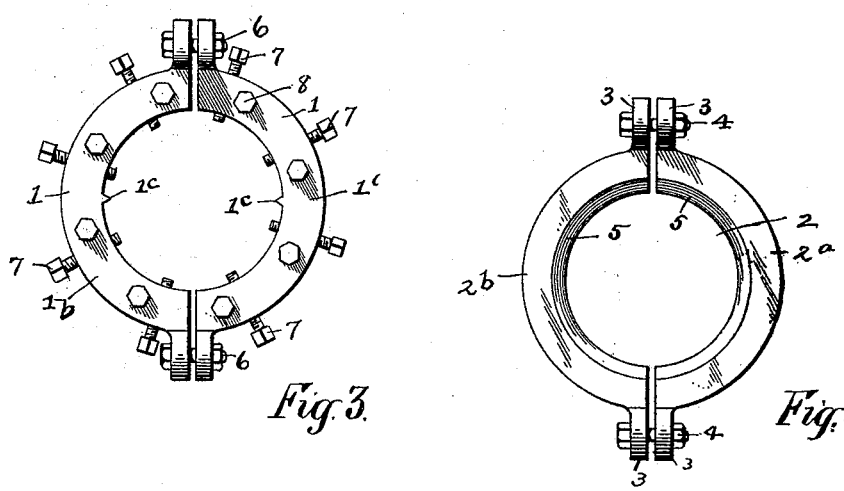
WITNESSES:
H. B. Bradshaw
J. H. Fravel
INVENTOR
Frank A. Nusbaum
BY
C. C. Shepherd
ATTORNEY

UNITED STATES PATENT OFFICE.

FRANK A. NUSBAUM, OF COLUMBUS, OHIO.

LEAK-CLOSING PIPE-CLAMP.

SPECIFICATION forming part of Letters Patent No. 646,754, dated April 3, 1900.

Application filed April 26, 1899. Serial No. 715,112. (No model.)

*To all whom it may concern:*

Be it known that I, FRANK A. NUSBAUM, a citizen of the United States, residing at Columbus, in the county of Franklin and State of Ohio, have invented a certain new and useful Improvement in Leak-Closing Pipe-Clamps, of which the following is a specification.

My invention relates to the improvement of pipe-joint clamps; and the objects of my invention are to provide an improved pipe-joint clamp of simple and effective construction whereby leaks occuring at the junction of a pipe and a pipe coupling or fitting may be effectively closed and to produce my improved clamp in an inexpensive manner and admit of its being readily applied for the purpose for which it is designed. These objects I accomplish in the manner illustrated in the accompanying drawings, in which—

Figure 1 is a side elevation of a portion of a pipe and elbow, showing my improved coupling in use thereon. Fig. 2 is a central sectional view of the same. Fig. 3 is a plan view of the upper or outer clamping-ring, and Fig. 4 is an under side view of the inner clamping-ring.

Similar numerals refer to similar parts throughout the several views.

In carrying out my invention I employ two clamping-rings, which are indicated, respectively, at 1 and 2. In constructing the inner ring 2 I form the same of two half-ring sections $2^a$ and $2^b$, the ends of said ring-sections being provided, as indicated at 3, with outturned lugs which are adapted to be drawn together by bolts 4. The ring 2 thus formed has its under side adjoining its inner surface recessed, as indicated at 5 in Figs. 2 and 4. The outer ring 1, which is of similar construction to the ring 2, being formed of two sections $1^a$ and $1^b$ and united by bolts 6, has extending therethrough at desirable intervals set-screws 7, the latter being shown in horizontal positions in the drawings. Extending through threaded openings in the sections of the ring 1 at desirable intervals and in directions at right angles with the set-screws 7 are set-screws 8. In forming the sections of the ring 2 I produce on the inner face of each section a vertical tooth or projection $1^c$.

In order to illustrate the use of my improved joint-clamp, I have shown in Figs. 1 and 2 of the drawings a vertical section of pipe 9, with which is connected in the usual manner an elbow-coupling 10. Assuming that a leak has occurred at the junction of the pipe and elbow, at which point leaks are commonly formed, the manner of stopping said leak by the use of my device is as follows: Suitable pliable packing material, such as indicated at 11, having first been wound about the pipe 9 at its junction with the elbow 10, the ring-sections $2^a$ and $2^b$ are made to embrace said pipe 9 in such position as to cause the inner side recess 5 of the ring 2 to receive the packing 11. The two ring-sections are then connected and drawn firmly toward each other through the medium of the bolts 4, thus clamping said ring firmly about the pipe 9 at its junction with the shoulder formed by the upper end of the elbow 10. In a like manner the ring-sections $1^a$ and $1^b$ are now secured about the pipe 9 at a short distance from the ring 2, the horizontal set-screws 7 being turned inward by a wrench or otherwise until said ring 1 is firmly clamped about the periphery of the pipe, the projections $1^c$ being thus forced into engagement with said pipe-surface. By now turning downward on the set-screws 8 the latter may, by contact with the upper surface of the ring 2 and by pressure thereon, be made to firmly press the sections of said ring 2 into such close contact with the end of the elbow or coupling 10 as to insure a stoppage of any leak and prevent the escape of steam or water or gas at the junction of said pipe and coupling.

It will be observed that the construction and arrangement of parts of my device are exceedingly simple and inexpensive and that the same may be quickly and effectively applied for the purposes set forth while the steam or water conducting pipe is in use.

Having now fully described my invention, what I claim, and desire to secure by Letters Patent, is—

In a leak-closing pipe-joint clamp, the combination with a section of pipe and an elbow receiving one end of said pipe-section, of a ring 2 formed of adjustably-connected sections and provided with a packing-recess on its inner side, said ring adapted to encircle said pipe-section and bear on the shoulder formed by the end of the elbow, a clamping-ring 1 formed of adjustably-connected sections, set-screws 7 working through screw-holes formed in the sections of said ring 1, and set-screws 8 working in screw-holes in the outer ring 1 and bearing on said inner ring 2, substantially as specified.

FRANK A. NUSBAUM.

In presence of—
C. C. SHEPHERD,
C. E. SHOCKEY.